Feb. 2, 1960
R. H. OWENS
2,923,559
VEHICLE SAFETY DEVICE
Filed Feb. 18, 1958
2 Sheets-Sheet 1
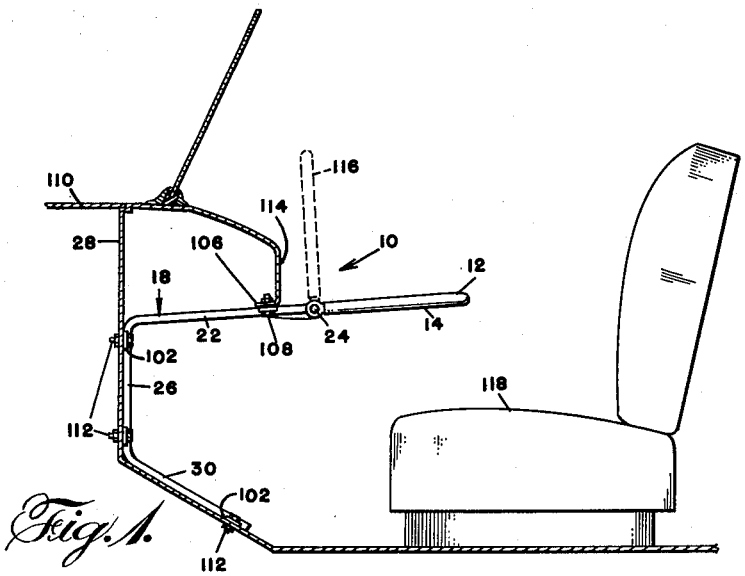
Fig. 1.
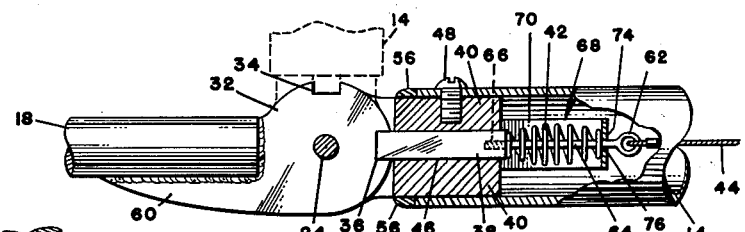
Fig. 2.
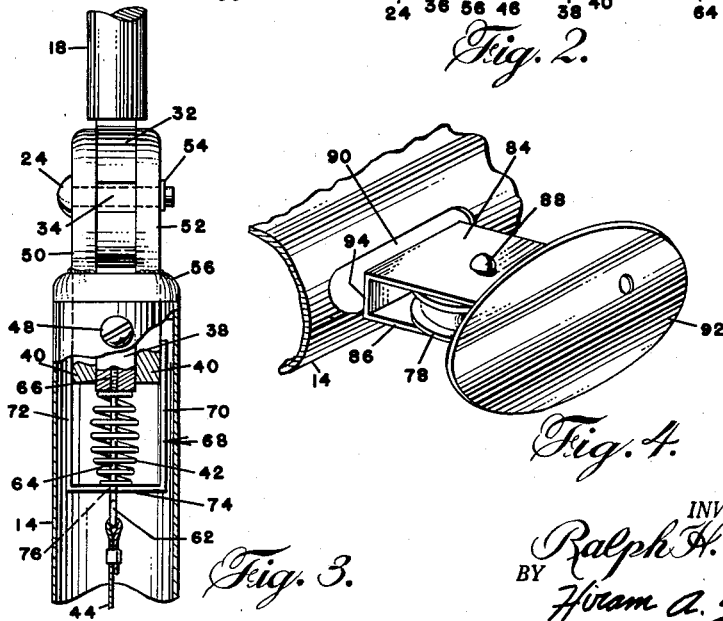
Fig. 3.
Fig. 4.
INVENTOR.
Ralph H. Owens
BY Hiram A. Sturges
Agent

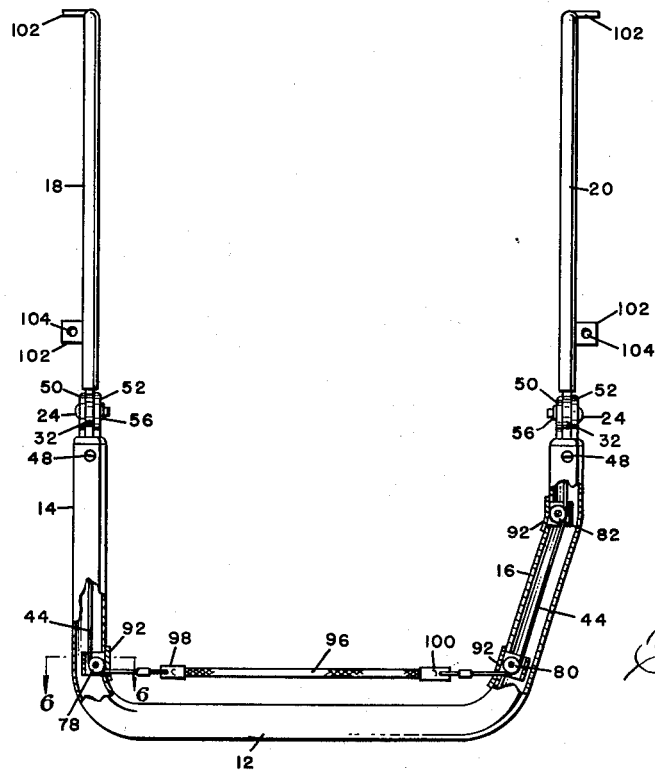
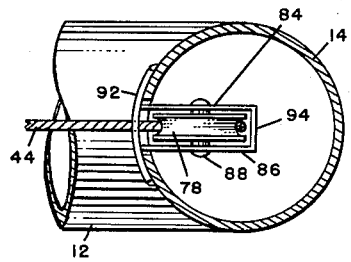

United States Patent Office 2,923,559
Patented Feb. 2, 1960

2,923,559
VEHICLE SAFETY DEVICE
Ralph H. Owens, Omaha, Nebr.
Application February 18, 1958, Serial No. 715,891
3 Claims. (Cl. 280—150)

This invention relates to safety devices for motor vehicles and in particular a transversely disposed bar pivotally mounted at the lower edge of the instrument panel and designed to be moved upwardly to an out-of-the-way position when not in use and to a position in front of a person on the front seat of a vehicle when the vehicle is operating whereby upon being thrown forward as a result of the vehicle making a suddent stop the body of the person is held by the bar and prevented being thrown through the windshield, or from the vehicle.

The purpose of this invention is to provide means for arresting the forward movement of the body of a person on the front seat of a motor vehicle to prevent the person being thrown against the windshield of the vehicle when the vehicle comes to a sudden stop, such as in a crash.

Various types of safety belts and other harness, and different forms of bars have been provided for retaining persons on front seats of vehicles to prevent injury to the person when the vehicle in which the person is traveling comes to a sudden stop; however, such devices are uncomfortable, or stored in such positions that occupants of vehicles take the chance of riding without applying the safety devices. With this thought in mind this invention contemplates a safety device that is so positioned in a vehicle that it seems the natural thing to do to draw the bar of the device to a position directly in front of a person on the front seat of the vehicle, and with the bar in this position it would be substantially impossible for a person to be thrown out of a vehicle or against the windshield thereof should the vehicle come to a sudden stop.

The object of this invention is, therefore, to provide means for mounting a safety bar in front of the front seat of a vehicle with the bar in such a position that it would seem natural for the occupant on the front seat of a vehicle to reach over and draw the transversely disposed bar downwardly to a position in front of the occupant.

Another object of the invention is to provide a safety device for motor vehicles that is so designed that it may be installed in vehicles now in use.

Another important object of the invention is to provide a bar that provides a safety device for motor vehicles in which the bar may also be used as an arm rest.

A further object of the invention is to provide a transversely disposed rod mounted to be drawn to a position across the front seat of a motor vehicle to prevent occupants of the front seat being thrown forwardly or from the vehicle in which a person in the front seat of the vehicle would be inclined to grip the bar should a door of the vehicle be accidentally thrown open.

A still further object of the invention is to provide a safety bar mounted to be positioned directly in front of a person in the front seat of a vehicle to prevent the person being thrown forwardly in the event of a sudden stop or crash in which the bar and mounting means thereof are of simple and economical construction.

With these and other objects and advantages in view the invention embodies a pair of legs mounted in the inclined portion of a floor of a vehicle below the instrument panel and extended upwardly against the inner surface of the fire wall of the vehicle, and across the under surface of the instrument panel, and a substantially U-shaped bar pivotally mounted in upper ends of the legs and having latch means for retaining the rod in an upwardly disposed position or in an extended position wherein the rod is in front of a passenger of the vehicle.

Other features and advantages of the invention will appear from the following description taken in connection with the drawings, wherein:

Figure 1 is a longitudinal section through the intermediate portion of a motor vehicle showing the safety bar of this invention in an operative position in full lines and in an out-of-the-way position in dotted lines.

Figure 2 is a longitudinal section through a pivotal connection at one end of the safety bar, with the parts shown on an enlarged scale.

Figure 3 is a plan view of the hinge or pivotal connection shown in Figure 2, also with the parts shown on an enlarged scale.

Figure 4 is a perspective view illustrating a pulley mounting designed to extend into one of the tubular supports or arms of the safety device.

Figure 5 is a view illustrating the formation of the legs with extended ends of the legs connected by a safety or cross bar.

Figure 6 is a cross section through one of the tubular members taken on line 6—6 of Figure 5, showing one of the pulleys in a tubular member, and with the parts shown on an enlarged scale.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a safety bar having arms 14 and 16 at the ends, numeral 18 a supporting leg at one side of the device, and numeral 20 a leg on the other side of the device. The legs are formed with upper sections 22 to the ends of which the arms are pivotally connected by pins 24. The legs are also provided with intermediate sections 26 which are positioned against the inner surface of a fire wall 28 of a motor vehicle and from upper ends of which the sections 22 extend. The legs also include lower sections 30 which are attached to the inclined surface at the forward end of a motor vehicle floor and from upper ends of which the sections 26 extend. Numeral 32 indicates discs having notches 34 and 36 in edges thereof which extend from the ends of the upper sections 22 of the legs, and through which the pins 24 extend. Numeral 38 indicates latches slidably mounted in bearings 40 in the ends of the arms and the latches are resiliently held by springs 42, selectively, in the notches 34, or the notches 36 of the discs 32; and numeral 44 indicates a cable on the inner surface of the bar 12 and extended through the arms 14 and 16 to the latches 38.

The bearings 40 which are provided with longitudinally disposed openings 46 in which the latches 38 are slidably mounted and which are secured in the ends of the arms 14 and 16 by screws 48, are provided with bars 50 and 52 in which the pins 24 are positioned, as shown in Figure 3. The pins 24 are secured against accidental removal by snap rings 54 against outer surfaces of the bars 52. The lower edges of the discs 32 are provided with fingers 60 which, with the discs are secured, such as by welding, to the extended ends of the upper sections 22 of the legs. The ends of the cord 44 are secured to eyes 62 of rods 64 which are extended through the springs 42 and threaded in sockets 66 of the latches 38, whereby pulling on the cord withdraws the latches and permits the safety bar to be moved to an extended position for use or to an upwardly disposed position. The springs are positioned in yokes 68, arms 70 and 72 of which are secured, such as by welding, to ends of the plates 50 and 52, and the ends of the arms 70 and 72 are connected by end plates 74 that are provided with openings 76 through which the rods 64 extend. With the parts assembled in this manner the latches are withdrawn by the cord and urged into the notches of the discs by the springs.

The cord or cable 44 is trained over pulleys 78 and 80 at the ends of the safety bar 12 and also over a pulley 82 at the forward end of an inclined section of the arm 16. The pulleys are mounted between plates 84 and 86 by pins 88, and the tubular arms are provided with openings 90 that are positioned to receive the pulleys and plates, as shown in Figure 4. The plates 84 and 86 extend from a cover plate 92 and the extended ends of the plates are connected with a plate 94. The cable or cord is provided with a gripping section 96, having fittings 98 and 100 at the ends to facilitate connecting the cables to the gripping section, and the cable may be continuous as shown, or provided in sections with one section attached to one end of the safety bar and the other section attached at the opposite end thereof.

The legs 18 and 20 are provided with tabs 102 having openings 104 therein and the tabs are positioned to accommodate screws for fastening the legs to the floor, fire wall, and instrument panel of a vehicle. The tabs positioned below the outer edge of the instrument panel are connected to a flange 106 on the lower edge of the instrument panel by bolts 108.

Annular plugs 56 are disposed in the end openings of the tubular arms 14 and 16 and snugly about the plates 50 and 52 of the hinge assembly. A rearward portion 57 of the plugs 56 is of reduced diameter to snugly engage the interior wall of the tubular opening. The plugs may be spot welded in place or otherwise secured and provide a pleasing appearance and stability to the hinge plates.

*Operation*

With the parts assembled as illustrated and described, and installed in a motor vehicle 110 by screws 112 extended through the openings 104 of the tabs 102 of the legs, the bar extends upwardly in front of the instrument panel 114, as indicated by the broken lines 116, and the natural tendency of a person in the seat 118 would be to reach over and pull the bar down to the position shown in full lines in Figure 1, which is the operative position. However, even with the bar in the upwardly disposed position it would provide protecting means for a person in the seat as it would prevent the person being thrown against the windshield, and in case of an accident, the natural tendency would be to grab the bar to prevent being thrown from the vehicle.

Furthermore, the bar provides an arm rest when in the lower position, and may also provide supporting means for a map, book, or the like.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts such as come within the purview of the invention claimed may be resorted to in actual practice, if desired.

Having now described the invention that which is claimed to be new and desired to be procured by Letters Patent, is:

1. A motor vehicle safety device comprising a bar, spaced legs having inclined lower sections designed to be secured to the inclined portion of the floor at the forward end of the vehicle, vertical sections designed to be positioned against the fire wall of the vehicle, and horizontally disposed sections designed to be positioned below and attached to the instrument panel of the vehicle with outer ends of the legs extended from said panel, said bar having arms extended from ends thereof, means for pivotally connecting the arms of the bar to the ends of the legs extended from the instrument panel, and latching means for retaining the arms, selectively, in vertically disposed positions, or in horizontally disposed positions whereby the bar is positioned transversely of the vehicle and in front of a person on a seat of the vehicle.

2. In a safety device for a motor vehicle, the combination which comprises a pair of legs having inclined lower sections designed to be mounted on the inclined portion of a floor of a vehicle, vertically disposed sections extended from the upper ends of the inclined sections upwardly on the inner surface of the fire wall of the vehicle, and horizontally disposed sections extended from upper ends of the vertically disposed sections rearwardly below the instrument panel of the vehicle and to a point spaced from said panel, a transversely disposed bar having arms extended from ends thereof, means pivotally connecting extended ends of the arms to the ends of the legs positioned to be spaced from the instrument panel, and means locking the arms, selectively, with the bar extended rearwardly to a position in front of a person on a seat of the vehicle, or with the bar extended upwardly to an out-of-the-way position.

3. In a safety device for a motor vehicle, the combination which comprises a pair of legs designed to extend upwardly on the inclined surface of a floor of a motor vehicle, upwardly on the inner surface of the fire wall of the vehicle, and rearwardly below the lower edge of the instrument panel of the vehicle and to points spaced from said panel, the ends of the legs spaced from the instrument panel having discs with notches therein thereon, a tubular bar having arms extended from ends thereof positioned with extended ends of the arms pivotally mounted on the discs, latching elements in the arms positioned to coact with the notches of the discs for retaining the arms and bar, selectively, in outwardly extended positions, or in upwardly disposed positions, resilient means for urging the latching elements into the notches of the discs, and a cable extended from the latching elements through the arms for withdrawing the latching elements from the notches of the disc to facilitate adjusting the position of the bar.

References Cited in the file of this patent

UNITED STATES PATENTS

| 1,473,436 | Leopold | Nov. 6, 1923 |
| 2,749,143 | Chika | June 5, 1956 |

FOREIGN PATENTS

| 1,065,793 | France | Jan. 13, 1954 |
| 848,310 | Germany | Jan. 19, 1953 |
| 880,862 | Germany | June 25, 1953 |

OTHER REFERENCES

Germany, G19,406 (K1.63c,70) Nov. 15, 1956.